March 20, 1945.　　　J. R. ORELIND　　　2,371,839
TRACTOR-MOUNTED IMPLEMENT
Filed Aug. 1, 1942　　　4 Sheets-Sheet 1
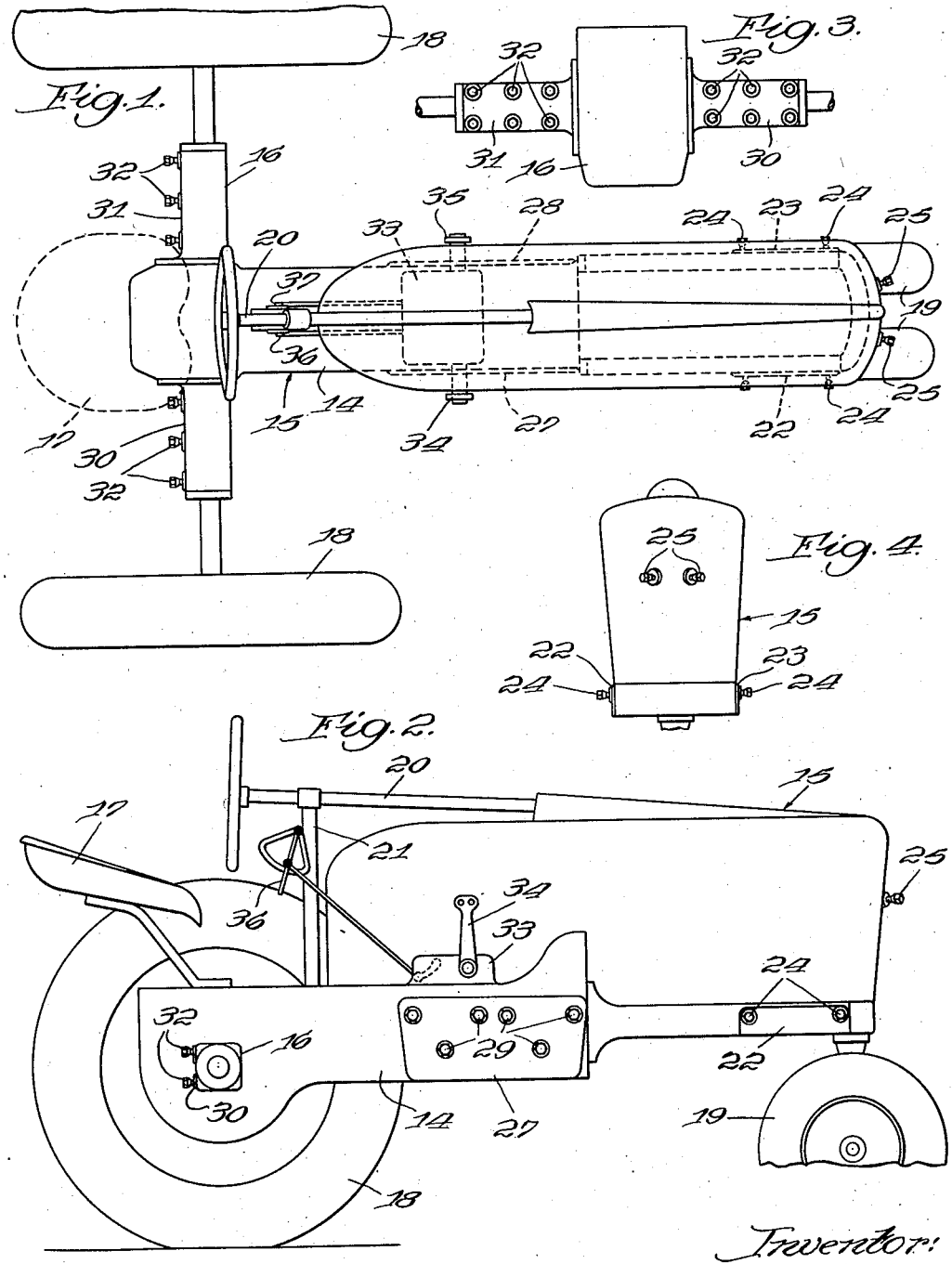

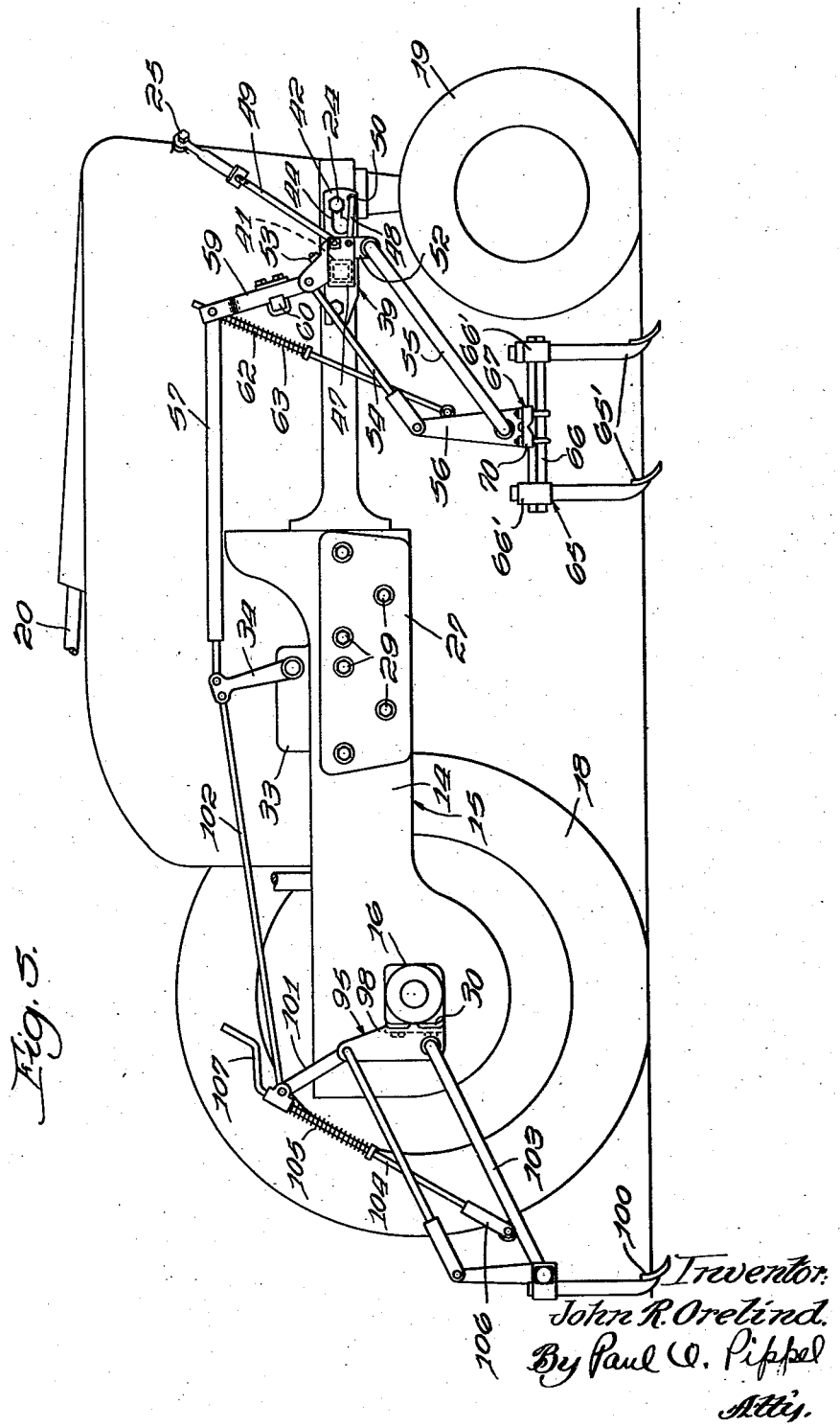

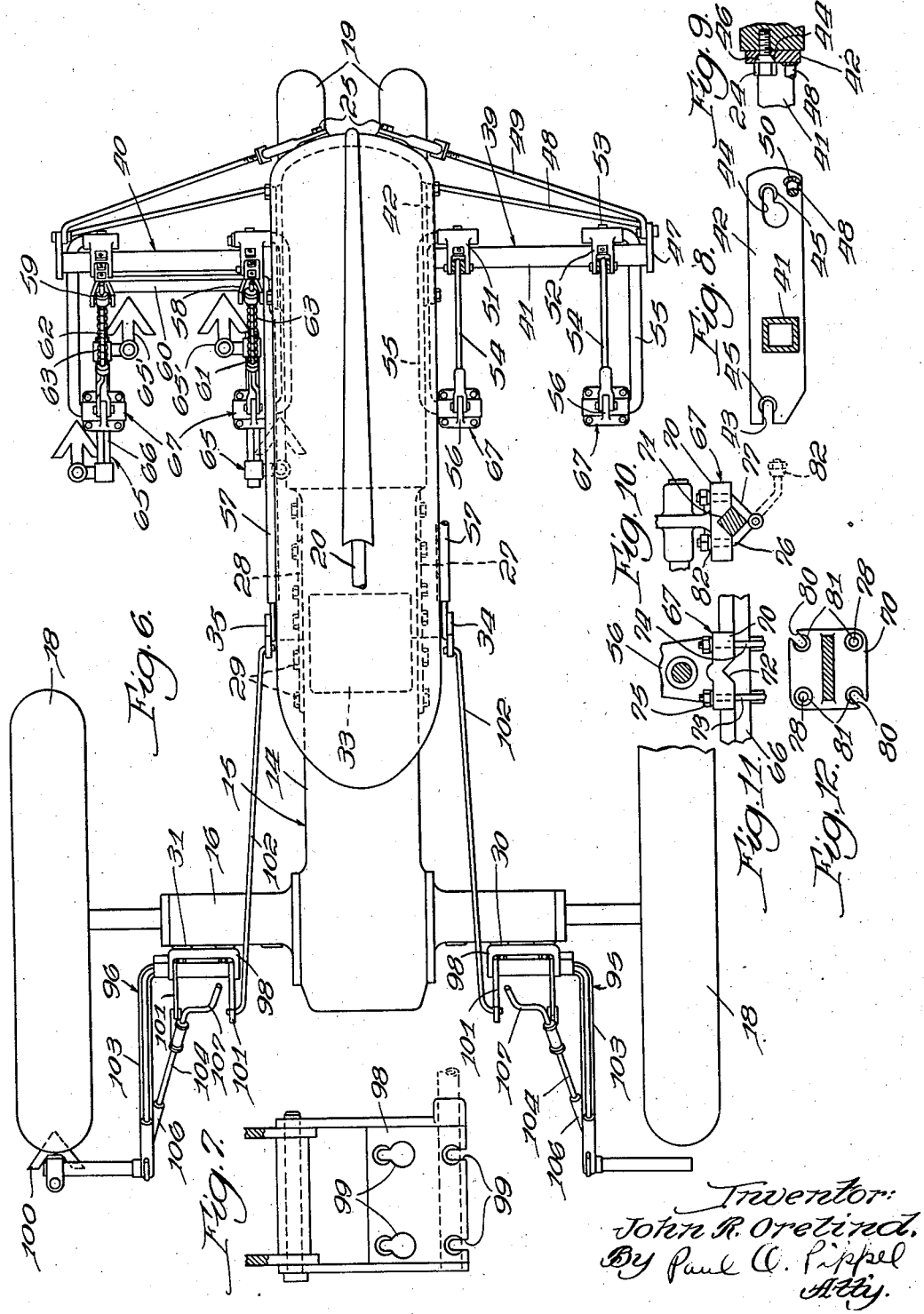

Inventor:
John R. Orelind.
By Paul O. Pippel
Atty.

Patented Mar. 20, 1945

2,371,839

UNITED STATES PATENT OFFICE 2,371,839

TRACTOR-MOUNTED IMPLEMENT

John R. Orelind, Wilmette, Ill., assignor to International Harvester Company, a corporation of New Jersey Application August 1, 1942, Serial No. 453,180

6 Claims. (Cl. 97—47)

This invention relates to tractor-mounted implements and, more particularly, to the means for connecting individual tools to the tool-supporting frames and the connection of these frames to the tractor on which they are carried.

It is an object of the present invention to provide a universal supporting frame to which various individual tool units having attaching portions extending respectively in different directions may be readily attached and detached, and a common means on the supporting frame for connecting these various tools, whereby complete new supporting frames need not be provided for the different tools.

It is another object of the invention to provide a cultivating arrangement comprising a plurality of sections separately attachable to attaching portions provided at different locations on the tractor, whereby the entire arrangement can be more readily handled and connected to the tractor without the application of brute strength, since none of these units need be of greater weight than can be easily lifted by an average person.

It is still another object of the invention to provide an arrangement for the attachment of tool-supporting frames to the tractor and for connecting individual tools to the tool-supporting frames, whereby the specific fastening bolts are not separable at any time from either the tractor or from the tool-supporting frame and to thereby provide an arrangement whereby the attaching screws or parts will never be lost upon changing over the arrangement or upon disconnecting the same from the tractor.

It is still another object of the invention to provide a tool-carrying frame which is more adaptable to various changing methods of farming without requiring the necessity of designing complete new machines. The common tool-supporting frames serve as the means to which special units can be readily attached and adapted to meet the new conditions and to thereby provide a saving in cost to the farmer upon his desire for the new or special units.

It is still another object of the invention to provide an arrangement whereby the adjustment of the individual units may be preserved, the units being removed intact, and whereby considerable time of the operator will be saved, which would ordinarily be required for resetting of the individual tools.

According to the present invention, there has been provided on the tractor vertically extending attaching portions having permanently secured thereto pairs of laterally spaced cap-screws or stud bolts. These attaching portions are located throughout the extent of the longitudinally extending body portion and on the transverse rear axle structure for the connection thereto of units adapted to be located at the rear of the tractor. Universal tool-supporting frames are readily attachable to these vertically extending attaching portions and are firmly secured by tightening of the cap-screws. Each of the supporting frames has a pair of slotted portions adapted to cooperate with the laterally spaced cap-screws. The tool-supporting frames also have a universal clamping device to which the individual working-tool units can be readily attached. This clamping device is so adjustable that tools having either an attaching portion extending in a longitudinal direction or in a transverse direction may be easily attached. The securing bolts for the clamping means are readily adaptable for the different attaching portions and are so formed that the clamping nuts thereon need only be loosened to effect change. The fastening bolts for this clamping device need never be removed from the tool-supporting frame. To these tool-supporting frames a variety of units may be attached, and some of these units are of such character as to form a furrow and to receive material dispensed from dispensing-mechanism units and similarly attached to the tractor-attaching portions in a manner similar to the attachment of the tool-supporting frames themselves. At no time are the fastening bolts or nuts removable from the tractor or the tool-supporting frame when the change to the different working-tool units is effected or when the tool-supporting frame is removed from the tractor.

For other advantages and for a better understanding of the invention, reference may be had to the following detailed description taken in connection with the accompanying drawings, in which:

Figure 1 is a plan view of a tractor, showing the vertically extending attaching portions with the laterally spaced stud bolts thereon;

Figure 2 is a side elevational view with one of the traction wheels removed, showing the full face of the attaching portions and stud bolts on the longitudinally extending body portion and the stud bolt attaching portion on the rear axle structure;

Figure 3 is a rear view of the rear axle structure and of the vertically extending attaching portions thereon;

Figure 4 is a frontal view of the forward portion of the tractor, showing particularly the stud bolts for connecting bracing rods;

Figure 5 is a view in elevation of the tractor and similar to that shown in Figure 2 but with cultivating frame sections attached to some of the tractor-attaching portions;

Figure 6 is a plan view of a tractor and of the supporting frames connected respectively to opposite sides of the tractor;

Figure 7 is a detail view of the bracket structure of a rear unit having a slotted plate adapted to cooperate with the attaching portion on the rear axle structure;

Figure 8 shows a detail view of the plate having slots and serving for the attachment of the forward tool-supporting frames to the attaching portions located on the forward portion of the tractor;

Figure 9 is a detail fragmentary view in elevation, partly in section, illustrating the nature of the cap-screws carried by the tractor-attaching portions;

Figure 13:
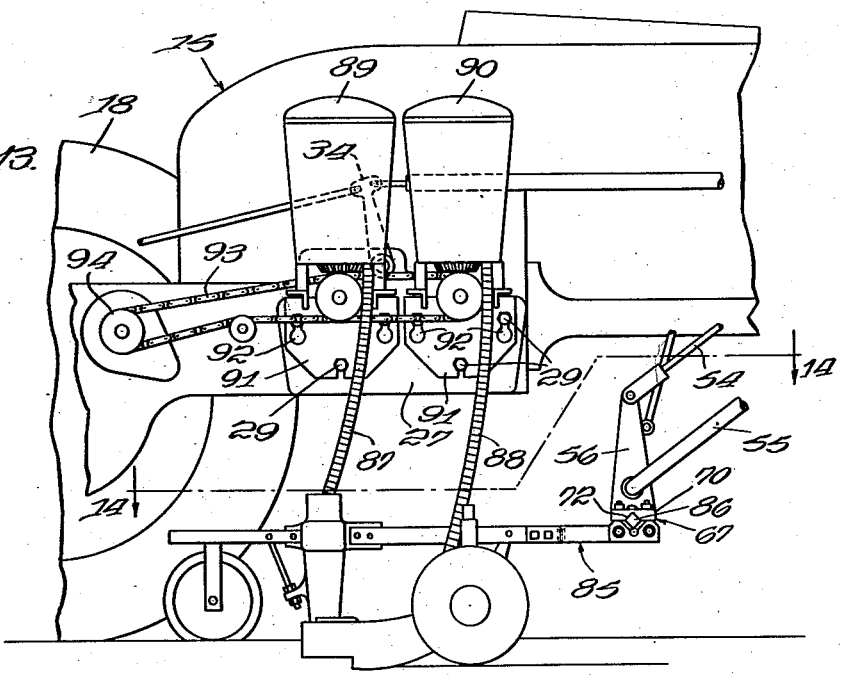
Figure 14:
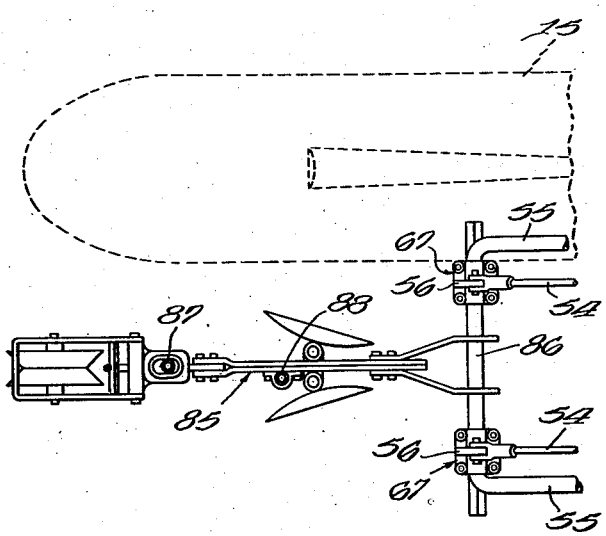

Figures 10, 11, and 12 are detail views of the universal clamping device on the tool-supporting frames;

Figure 13 is a view in elevation of a portion of the tractor arrangement and of the universal frame with the dispensing arrangement connected thereto;

Figure 14 is a view, taken along the line 14—14 of Figure 13 and looking in the direction of the arrows, of the furrowing unit with its transversely extending attaching portion connected between the universal clamping devices.

Referring now to Figures 1, 2, 3, and 4, there is shown a tractor 15 having a central, longitudinally extending body portion 14 and a transversely extended rear axle structure 16 on which is located an operator's station 17. The rear axle structure 16 is supported on tractor drive wheels 18, while the forward portion of the longitudinally extending body portion is supported on dirigible wheels 19 steerable by a steering mechanism 20 accessible to the operator's station 17 on the rear axle structure of the tractor. The steering mechanism 20 is supported on a vertically extending steering post 21.

On the forward part of the body portion 14 are right and left vertically extending attaching portions 22 and 23, each of which has laterally spaced stud bolts 24 permanently secured thereto. As viewed in Figure 4, and vertically removed from the attaching portions 22 and 23, there are provided bracing rod stud bolts 25 serving as a means for clamping brace rods in a manner to be described later.

Rearwardly of the attaching portions 22 and 23 on the front of the body portion and ahead of the rear axle structure 16 are provided other vertically extending attaching portions 27 and 28, each of which has respectively two sets of three stud bolts 29. These attaching portions, located intermediate the front of the body portion and the rear axle structure, are to serve for the connection thereto of material-dispensing units hereafter described. On the rear axle structure 16, as shown more clearly in Figure 3, there are provided similar vertically extending attaching portions 30 and 31 having laterally spaced stud bolts 32. It should now be apparent that there has been provided a tractor having attaching portions in which are located laterally spaced cap-screws which remain on the tractor at all times and when the tractor is free of its working tools.

In the longitudinally extending body portion is a power lifting mechanism 33 having fore and aft swingable arms 34 and 35 projecting respectively at opposite sides of the longitudinally extending body portion 14. This power lift mechanism 33 includes manually operable controlling elements 36 and 37 connected to effect respectively the operation of the swingable arms 34 and 35. These control elements 36 and 37 are accessible to the operator's station 17 on the rear of the tractor. The power lift mechanism 33 is thus a complete unit and is carried by the tractor at all times.

Referring particularly to Figures 5 and 6, it will be noted that the tractor has attached thereto the supporting frames of a cultivating arrangement. By having at least four individual supporting frames, the tractor cultivating attachment need not be handled in its entirety, and with little effort these units can be attached to the tractor. If necessary, the units can be readily and bodily lifted without placing the operator to any great task. However, this is seldom necessary for usually the tractor may be readily alined with the units prior to the attachment taking place. To the respective attaching portions 22 and 23 are attached, respectively, tool-supporting frame units or sections 39 and 40. Description will now be made of one of the supporting frames or sections, and it shall be understood that the description and similar numerals apply also to the other section.

This section 39 includes a transversely extending member 41 having a longitudinally extending plate 42 on its inner end in which there are provided slotted openings 43 and 44, see Figure 8. Each of these slotted openings 43 and 44 has a countersunk portion 45 in the closed end of the same. This countersunk portion 45 receives a conical portion 46 on the cap-screws or stud bolts 24. It will be noted that the slotted openings 43 and 44 extend longitudinally, and for connection with the laterally spaced cap-screws 24 the plate 42 is slid rearwardly after the slotted openings are seated over the cap-screws 24. For a view of the cap-screw seated in its final position, see Figure 9. With the cap-screw so seated, the plate 42 is rigidly and positively held against any tendency to slide forwardly. It should now be apparent that, by this means, the unit section 39 can be readily attached to the attaching portion 22 on the tractor with minimum effort and without the necessity of having to provide loose screws for completing the attachment, since the screws are permanently retained on the tractor-attaching portions.

On the outer end of the transversely extending portion 41 of the unit, there is provided a vertically extending plate 47 which extends forwardly of the transverse bar 41 and to which are attached the ends of brace rods 48 and 49. The brace rod 48 is to brace against rearward movement and is permanently or weldingly secured to the forward end of the plate 42, as indicated at 50. The brace rod 49, however, is used for bracing against downward movement on the end of the transverse portion 41 and, at its upper end, is connected to the front of the tractor by means of the cap-screw 25. This cap-screw 25 remains permanently on the tractor, and the end of the rod 49 has formed on it a slot adapted to fit over the cap-screw and, when the cap-screw 25 is tightened, the brace rod is positively retained. Thus, there is no necessity for removal of the cap-screw 25 from the tractor.

The transverse portion 41 is of square section and is adapted for the mounting thereon of rig bracket members 51 and 52, respectively retained on the same by U-bolts 53. By using these U-bolts, the brackets 51 and 52 are laterally adjustable on the tool bar. Connected to the brackets 51 and 52 are, respectively, pairs of vertically spaced upper and lower links 54 and 55 having pivotally connected on their lower ends a vertically extending member 56. The connection of the links 54 and 55, respectively, with the brackets 51 and 52 and with the members 56 is such that vertical adjustment of the members 56 and of the links can be readily effected.

Once the tool-supporting frames are connected to the tractor, connection is made with the single arm 34 through a longitudinally extending link 57 connected at its forward end to the upper end of a fore and aft movable lever 58 pivoted on the upper end of the bracket 51 on the transverse portion 41. This lever 58 is connected to an outer lever 59 similarly pivoted on the bracket member 52 by means of a transverse member 60. Once movement is imparted to these levers, they will be simultaneously moved either fore or aft, and the individual rigs, comprising the member 56 and the links 54 and 55, will be raised vertically inasmuch as lift rods 61 and 62 are respectively connected to the lifting levers 58 and 59, the lifting rods being connected respectively to the rig members 56. Since the units at each side of the tractor are connected respectively to the opposite lifting rods 34 and 35, independent movement of the rigs on one side of the tractor may be had relative to the rigs on the other side of the tractor, depending upon which control element, 36 or 37, is operated. Each of the lift rods 61 and 62 has the usual pressure spring arrangements 63.

As viewed in Figure 6, it will be seen that there are provided on the section 40, at the left of the figure, cultivating tool structures or units 65 having longitudinally extending attaching portions 66 of square cross-section. Each tool unit has shovels or tool elements 65' adjustable on the portion 66, as indicated at 66'. When these tool units are so provided, the tractor may be used to cultivate row crops.

At the right side of Figure 6 is shown the section 39 without the cultivating tools attached thereto. This section without the tools shows the universal tool-supporting frame or carriage to which tools, other than cultivating tools having portions extending in a different direction than the attaching portions 66, can be connected. In other words, the unit section 39 remains on the tractor and, by virtue of a clamping device 67 which is universal in operation, can carry other working tools or units having differently extending attaching portions.

The universal clamping device located on the bottom end of the members 56 will now be described. Referring particularly to Figures 10, 11, and 12, it will be noted that there is provided on the lower end of the vertically extending member 56 a horizontally extending plate portion 70 having notched portions 71 and 72 angled with respect to each other and presentable from underneath the plate portion 70. As viewed in Figure 11, there is shown the longitudinally extending attaching portion 66, which forms the portion for attachment of the cultivating tool 65 or any other type of tool, fitted within the longitudinally extending notched portion 71. To make the attaching portion 66 secure within the notched portion 71, there is provided a pair of U-bolts 73 and 74 having respectively clamping nuts 75 thereon. These U-bolts, as viewed particularly in Figure 10, are formed in two parts 76 and 77. One of the parts of each U-bolt is adapted to be fitted within an opening 78, while the other part 77 is hingeable for removal to a position shown in dotted lines in Figure 10 from which the portion 77 can be relieved from a slot 80. Each of the openings 78 and 80 has a countersunk portion, as shown at 81, adapted to receive a conical portion 82 on the clamping nut 75.

Assuming the longitudinally extending portion 66 is in the notched portions 71, as viewed best in Figure 10, the U-bolts will extend transversely and about the attaching portion 66. When the clamping nuts 75 are tightened, the part 77 will fold into the slot 80 and the attaching portion 66 will be rigidly secured within the notched portion 71. As the part 77 is removed to the dotted line position, the U-bolt will remain on the plate portion 70 by virtue of the part 76 being confined within the hole 78. It should thus be apparent that there is no necessity for the U-bolts 73 and 74 being fully removed from the members 56.

Assuming that it is now desired to change the cultivator section to a section adaptable to carry some other type of tool, such as a furrowing structure 85 (Figure 14), having a transversely extending attaching portion 86, the U-bolts 73 and 74 are readily turned about through an angle of 90° on the part 76 for the connection of the parts 77 in different slotted portions 80. The transverse portion 86 would lie within the slotted portion 72 of the longitudinally extending plate 70. It will thus be apparent that the U-bolt can be used for securing the transversely extending portion 86 of a different tool. Hence, there has been provided a universal clamping means on the frame sections 39 and 40 and upon the lower ends of the members 56 which can carry units having attaching portions arranged to extend either longitudinally or transversely. Further, it should be noted that such arrangement should be provided with a U-bolt fastening means whereby the U-bolts need not be removed from the rigs nor their attaching nuts be removed from the rigs. The U-bolts remain permanently on the rigs, thereby eliminating the necessity of keeping on hand a supply of U-bolts and clamping nuts 82 for replacement due to their being so easily lost.

It will now be noted that the universal frames or sections are such as to permit an easy conversion of a cultivating arrangement into a material-dispensing arrangement (see Figures 13 and 14). Once the furrowing unit 85 has been attached, material-dispensing spouts 87 and 88 can be connected respectively with dispensing units 89 and 90 having a plate 91 with slotted portions 92 thereon adapted to fit over the capscrews 29 on the intermediate attaching portions 27 or 28 on the sides of the tractor. It should thus be apparent that this operation of seating the units 89 and 90 is done with little effort and as easily as the fitting of the tool-supporting sections 39 and 40 to their tractor-attaching portions 22 and 23. All this conversion of a cultivating arrangement into a dispensing arrangement has been effected with a minimum effort and without the necessity of having to provide fastening bolts or screws. It should be apparent that this change can take place very readily. Once the driving chain 93 has been connected over a sprocket 94 on the tractor, the conversion to a dispensing arrangement has been completed.

It should thus also be apparent that, by the provision, however, of such a tool-supporting frame, complete direct-connected implements need not be supplied when a different tool is desired, but that there be provided only individual units having different tools which can be readily attached to the tool-supporting frame which has a universal means adjustable to render the tool-supporting frame effective for the attaching of these different implements. The individual tool units, which are attached to the members 56, can be removed intact with the adjustments untouched, thereby saving the operator much time which would ordinarily be required for the resetting of the individual tool units.

To the rear attaching portions 30 and 31 on the rear axle structure 16, there are respectively connected track sweeps 95 and 96. These sections or units each includes a plate 98 having slotted openings 99 adapted to fit over the capscrews 32. It should thus be noted that these units can be as readily attached to the tractor as are the other units. These rear units 95 and 96 each carries a track sweep tool 100 and is so light in comparison with a cultivator section adapted to extend the full width of the tractor that the operator can attach the same to the rear axle structure with a minimum of effort. It may be brought out here that the use of individual sections which are light in weight has been provided throughout the arrangement. On the rear axle structure there are three sets of capscrews 32 at different lateral positions thereon, whereby the units may be adjusted on the tractor as the tractor wheels 18 are adjusted in or out. The units 95 and 96 include a pivotal lever 101 which is attached to one of the arms 34 or 35 of the lifting mechanism 33 by means of a link 102 whereby coordinated lifting movement will be effected with the rigs located at the forward portion of the tractor. The lever 101 is connected to a lower parallel link 103 by an adjustable lift rod 104 having the usual pressure spring 105 thereon. The lift rod 104 is adjustable in a sleeve 106 by turning of the crank 107 on the upper end of the rod which is accessible to the operator's station 17.

It should now be apparent that there has been provided an arrangement of sections forming a part of an implement arrangement which can be quickly attached to the tractor without the use of bolts not already on the tractor, and that this implement arrangement is such that sections of the same can be readily adapted for different types of working tools without the necessity of providing fastening bolts not already located on the tool-supporting frame.

While various changes may be made in the detail construction, it shall be understood that such changes shall be within the spirit and scope of the present invention as defined by the appended claims.

What is claimed is:

1. In combination, a tractor having an attaching portion, a working-tool-supporting frame removably attached to the tractor attaching portion, and a universal clamping means carried by the working-tool-supporting frame and adaptable for securing to the supporting frame the attaching portion of working tools of different varieties having attaching portions extending respectively in different directions, whereby, for the change to different tools, the supporting frame remains on the tractor and the attachment of the different tools is made without the necessity of supplying additional clamping parts.

2. In combination, a tool-supporting structure, a universal clamping means provided on the tool-supporting structure for the connection thereto of working tools having respectively differently alined attaching portions, said clamping means including notched portions angled with respect to each other, a pair of U-bolts with accompanying nuts for fastening the attaching portion of the tools within the selected notched portion, said U-bolts including hinged parts so that, upon mere loosening of certain of the nuts, the parts may be swung free of their retaining slots to free the attaching portion and turned to a position to retain an attaching portion in another notch, whereby the tools may be changed or removed without removal of the accompanying nuts.

3. In combination, a tool-supporting structure, a universal clamping means provided on the tool-supporting structure for the connection thereto of working tools having respectively differently alined attaching portions, said clamping means including notched portions angled with respect to each other, bolt means having nuts for fastening the attaching portion of the tools within the selected notched portion, said bolt means having a part adapted to be retained by the clamping means and a part adapted to be swung free thereof upon loosening certain of the nuts, so that the attaching portion may be freed and the bolt means turned to a position to retain an attaching portion in another notch, whereby the tools may be changed or removed without removal of the accompanying nuts.

4. The combination with a tractor, of a frame structure removably mounted upon the tractor for the attachment of a variety of earth working tools, including generally parallel links pivoted at one end on the tractor for vertical movement and a bracket pivotally mounting the free ends of said links, said bracket comprising a standard having bearing portions receiving said links and a base portion having intersecting notches in the lower surface thereof extending in different directions to receive tool attaching portions extending in different directions, and clamping means associated with said base portion to secure said attaching portions in either of said notches.

5. The combination with a tractor, of a frame structure removably mounted upon the tractor for the attachment of a variety of earth working tools, including generally parallel links pivoted at one end on the tractor for vertical movement and a bracket pivotally mounting the free ends of said links, said bracket comprising a standard having bearing portions receiving said links and a base portion having intersecting notches in the lower surface thereof extending in different directions to receive tool attaching portions extending in different directions, and hinged clamping means associated with said base portion to secure said tool-attaching portions thereto, said hinged clamping means including a part adapted to be retained by the bracket and a part adapted to be swung free thereof and turned to a position to secure an attaching portion in another notch.

6. The combination with a tractor, of a frame structure removably mounted upon the tractor for the attachment of a variety of earth working tools, including generally parallel links pivoted at one end on the tractor for vertical movement and a bracket pivotally mounting the free ends of said links, said bracket comprising a standard having bearing portions receiving said links and a base portion having intersecting notches in the lower surface thereof extending in different directions to receive tool attaching portions extending in different directions, and reversible bolt and nut means associated with said base portion adapted to embrace said attaching portions and secure same in either of said notches.

JOHN R. ORELIND.